J. S. ROSE.
DIAMOND TOOL.
APPLICATION FILED DEC. 11 1918.
1,299,619.
Patented Apr. 8, 1919.
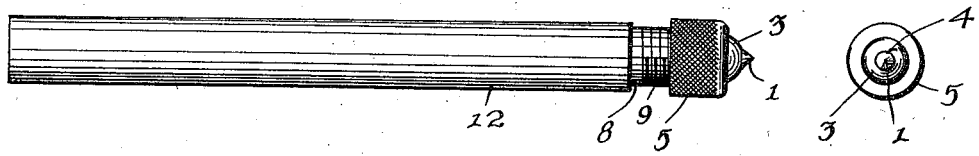
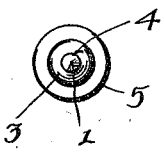
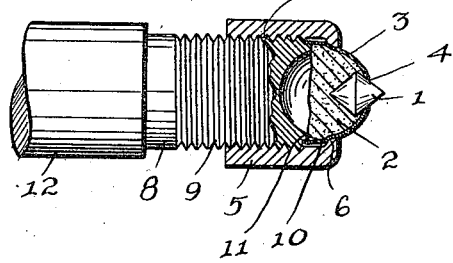
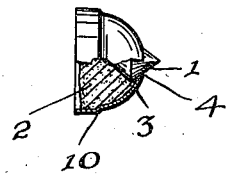
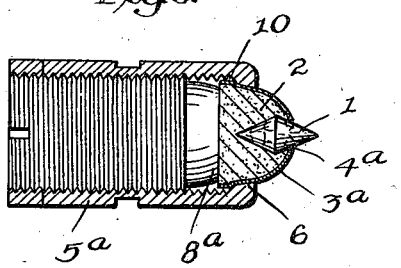
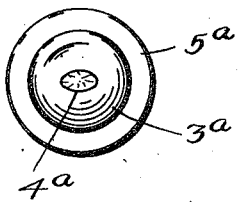
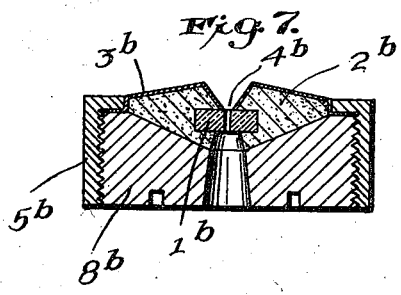
INVENTOR
Joseph S. Rose
BY
Clarence Balston
ATTORNEY

UNITED STATES PATENT OFFICE.

JOSEPH S. ROSE, OF PORT CHESTER, NEW YORK.

DIAMOND-TOOL.

1,299,619.

Specification of Letters Patent.

Patented Apr. 8, 1919.

Application filed December 11, 1918. Serial No. 266,292.

*To all whom it may concern:*

Be it known that I, JOSEPH S. ROSE, a citizen of the United States, residing in the village of Port Chester, Westchester county, and State of New York, have invented a new and useful Improvement in Diamond-Tools, of which the following is a specification.

The invention is concerned with the setting and holding of diamonds and jewels for industrial purposes. Various methods have been employed for setting the stones of diamond tools, such as are used for truing and shaping emery wheels. One mode is to form a cavity in a solid holder, and after placing the diamond therein, to peen or calk the metal around it, but it is difficult in this way to make the stone secure, because of its irregularity, the operation being one which is more suitable for round or circular shapes. Holding the diamonds by brazing or soldering is likely to fail to cause the brazing material to come into close contact with the stone, so that in use it is apt to loosen; and the high temperature necessary to melt the material tends to carbonize or injure the surfaces of the stone, with the result that after repeated settings it loses its characteristic and useful hardness. Even more injurious, for the same reason, is the embedding of the stone in a steel or other metal body or carrier while molten, the stone being positioned in a mold and the hot fluid metal cast around it. Furthermore, the resulting casting requires a substantial amount of machining to expose the point of the stone and to give the body the proper shape for use. Thus, while this method produces a complete rigid matrix around the stone, it is expensive, and the contraction of the metal on cooling is so great that it often checks the stone; in addition to which, as indicated, there is the drawback of softening or carbonizing the diamond by heat, so that after a number of such operations it becomes useless for the purpose for which it is intended. Tools wherein the stones are mechanically clamped have also been devised, but because of the irregularity of the stones and the severe duty which they are called upon to perform, they cannot always be held immovable.

In accordance with the present invention the stone is embedded in a cold-plastic composition setting to a permanent resisting matrix without injurious heat or contraction, capable when hard of holding the diamond under the exacting conditions of use. The matrix is inclosed by a protecting thin-walled cap of steel or the like, having an orifice of appropriate size and shape to expose the point, the cap and matrix being placed in a collar or socket having an internal flange or shoulder and clamped therein by the aid of a plug and screw. Pressure exerted upon the matrix by a screw or plunger while still plastic and confined with the stone, either in a tool constituted as described, or in a special press, condenses the material and causes it to become a solid mass, hard and enduring. Various hardening plastic materials and compositions, jacketed as described, may be used for the matrix, metallic alloys, such as dentist's amalgam, being particularly suitable.

In the accompanying drawings forming a part hereof:

Figure 1 is a side elevation of a diamond tool embodying the invention;

Fig. 2 is a front end view thereof;

Fig. 3 is an enlarged longitudinal sectional view of the forward part of the tool of Fig. 1;

Fig. 4 is a side elevation partly broken away of the jacketed matrix and stone;

Fig. 5 is a longitudinal section through another form of the diamond tool;

Fig. 6 is a front end view illustrating a different form of diamond point and opening; and Fig. 7 is an axial section through a wire drawing die embodying the invention.

1 designates the diamond, 2 the hardened amalgam matrix, 3 a thin-walled concavo-convex, steel cap having an opening 4 through which the point projects, 5 the collar or socket having an internal front flange 6 and internal screw-threads 7, and 8 the plug or internal member having screw-threads 9 coöperative with the threads 7 to hold the parts in rigid assembly, and, if so employed, to condense the matrix while setting; the whole constituting a diamond tool. The cap is preferably enlarged at the base to form a basal shoulder 10, which bears against the flange or shoulder of the socket. In Fig. 3 the forward end of the plug is represented as recessed and provided with an annular rim 11 fitting within the rear projection of the cap. Fig. 5 shows a flat-end plug 8ª bearing upon a flat rear face of the matrix.

The amalgam is molded around the stone within the hollow cap or jacket; and compressed while still plastic. This squeezes out superfluous liquid, hastens and improves the result of the setting of the material, and causes the matrix to have perfect contact with the stone and to fill solidly the cap. As stated, the tool may be used as a press for this purpose, or greater pressure may be secured by a die to be placed in a hydraulic press or the like.

The tool of Fig. 1 has a long stem 12 extending rearward from the plug, but the invention may be embodied in various other forms of tools, as, for example, the short plug $8^a$ with long socket $5^a$ of Fig. 5. The size and shape of the orifice in the cap will be determined by the size and shape of the point of the diamond and the work to be performed. Fig. 2 shows a circular opening, and Fig. 6 an elliptical one $4^a$, the cap in this instance being designated $3^a$. The body of the tool or setting can be used with stones and matrices of various sizes and shapes, the expense of the cap, which requires to be changed, being very small. Furthermore, by applying the collar or socket to various styles of plugs, the tool can be adapted to various types of machines.

As the diamond, except for the point exposed, is completely surrounded and intimately engaged by a hard matrix, which in turn is jacketed, the stone is at all times reliably held; and the means employed to secure this result is such that no injury is done to the stone in the production of the setting or subsequently, and the stone can be readily removed with its matrix and used interchangeably, or can be easily freed from the matrix and reëmbedded when necessary.

With variation in the sizes and shapes of the matrices, caps, sockets and plugs, numerous other specific tools, settings, instruments, and parts of apparatus, as, for example, cupped jewels for electrical meters, dies for drawing wire, glass-cutting tools, etching tools, etc., can be produced. Thus, Fig. 7 illustrates a wire-drawing die embodying the invention, the same comprising a socket $5^b$, a matrix $2^b$ of the character referred to, an apertured diamond $1^b$, a cap $3^b$ having an opening $4^b$ with funnel entrance, and $8^b$ a plug, which in this instance is open at the center to permit the passage of the wire, the relations being the same as in the other cases, except that the diamond naturally does not project.

What is claimed as new is:

1. An industrial stone setting, comprising a plug and socket, in combination with a removable thin metal cap clamped thereby and having an orifice, a matrix of compressed amalgam jacketed by the cap, and a stone embedded in the matrix.

2. A setting for an industrial stone, comprising a matrix wherein the stone is embedded, and an apertured cap filled by the matrix, combined with a socket having an internal flange to retain the cap, and a plug to enter the socket to force the cap and contents against the flange.

JOSEPH S. ROSE.